United States Patent [19]
Kuribayashi

[11] Patent Number: 5,284,455
[45] Date of Patent: Feb. 8, 1994

[54] SHAFT COUPLING HAVING MULTIPLE RIB CONNECTORS

[75] Inventor: Sadatomo Kuribayashi, Tokyo, Japan

[73] Assignee: Kay Seven Co., Ltd., Tokyo, Japan

[21] Appl. No.: 970,099

[22] Filed: Nov. 2, 1992

[30] Foreign Application Priority Data

Aug. 21, 1992 [JP] Japan .............................. 4-063909[U]

[51] Int. Cl.$^5$ ............................................. F16D 3/04
[52] U.S. Cl. ..................................... 464/105; 464/182
[58] Field of Search ............... 464/102, 104, 105, 147, 464/182

[56] References Cited

U.S. PATENT DOCUMENTS

| | | | |
|---|---|---|---|
| 1,316,011 | 9/1919 | Bailey et al. | 464/105 |
| 1,350,011 | 8/1920 | Du Bois | 464/105 |
| 1,488,497 | 4/1924 | Higgins | 464/105 |
| 1,887,081 | 11/1932 | Buettell | 464/105 |
| 3,438,221 | 4/1969 | Paulsen | 464/104 X |
| 3,485,062 | 12/1969 | Blake | 464/182 X |
| 3,884,049 | 5/1975 | Pauli | 464/182 X |
| 5,078,650 | 1/1992 | Foote | 464/104 |

Primary Examiner—Clifford D. Crowder
Assistant Examiner—John J. Calvert
Attorney, Agent, or Firm—Baker & Daniels

[57] ABSTRACT

On a mount member 6 at the side of the driving shaft, slide members 10a, 10b at the side of the driving shaft are each mounted and, on a mount member 8 at the side of the driven shaft, slide members 12a, 12b at the side of the driven shaft are each mounted. A torque transmitting member which is disposed therebetween comprises a disk portion 14a, an inner circumferential rib 14b, an outer circumferential rib 14c and an intermediate rib 14d extending between these ribs, and has through holes 16a, 16b and 18a, 18b having a pair of first and second inner slide surfaces slidable relative to a pair of outer slide surfaces of each slide member at the side of the driving shaft and the driven shaft. These first and second inner slide surfaces include a plane formed by the foregoing intermediate rib.

A shaft coupling according to the present invention can effectively cope with the eccentricity, angular deviation and the axial movement between the driving shaft side and the driven shaft side and which is simple in arrangement and lightweight while allowing a great torque to be transmitted.

3 Claims, 3 Drawing Sheets

5,284,455

SHAFT COUPLING HAVING MULTIPLE RIB CONNECTORS

FIELD OF THE INVENTION

The present invention relates to a shaft coupling, in particular, to a shaft coupling which can effectively cope with the eccentricity, angular deviation and the axial movement between the driving shaft side and the driven shaft side and which is simple in arrangement and lightweight while allowing a great torque to be transmitted.

BACKGROUND OF THE INVENTION

In various mechanisms for transmitting a rotational torque, the end portions of two rotating shafts are coupled to each other by means of a coupling. For example, the output rotating shaft of a motor and the input rotating shaft of a pump are connected by means of the coupling. In this case, it takes a considerable amount of labor to carefully install the motor and the pump so that the output rotating shaft of the motor and the input rotating shaft of the pump fully align with each other. Further, even if the installation is carried out by paying ample attention to such an alignment, some eccentricity and angular deviation remain between both rotating shafts, and further vibrations take place to the motor or the pump when they are actuated. In order to absorb these by the coupling portion, a flexible coupling using a flexible member such as a spring or rubber has conventionally been used. In addition, an Oldham coupling has been used as one which can cope with the eccentricity or angular deviation.

With such a shaft coupling, in general, a proper mount member is each mounted to the end portions of the driving shaft and the driven shaft respectively to couple the mount members at the side of the driving shaft and the driven shaft respectively by means of a proper mechanism.

SUMMARY OF THE INVENTION

An object of the present invention is to provide a novel shaft coupling which can effectively cope with the eccentricity, angular deviation and the axial movement between the driving shaft side and the driven shaft side and which is simple in arrangement and lightweight while allowing a great torque to be transmitted. Another object of the present invention is to provide a shaft coupling having the foregoing novel construction and which allows the torque to be smoothly transmitted and is easy in maintenance.

According to the present invention, in order to achieve the foregoing end, there is provided a shaft coupling in which:

a mount member at the side of the driving shaft is provided with a slide member at the side of the driving shaft having a pair of outer slide surfaces running parallel to a plane of first direction passing through the rotational axis of the driving shaft and extending toward the driven shaft;

a mount member at the side of the driven shaft is provided with a slide member at the side of the driven shaft having a pair of outer slide surfaces running parallel to a plane of second direction passing through the rotational axis of the driven shaft and extending toward the driving side; and a torque transmitting member is disposed between the mount member at the side of the driving shaft and the mount member at the side of the driven shaft, the transmitting member comprising a disk portion intersecting at a substantially right angle with the rotational axes of the driving shaft and the driven shaft, an inner and an outer circumferential ribs and an intermediate rib extending between these ribs, attached to the disk portion protruding toward the driving side and the driven side, the transmitting member having a pair of first inner slide surfaces slidable within a plane parallel to the plane of first direction relative to a pair of outer slide surfaces of the slide member at the side of the driving shaft and a pair of second inner slide surfaces slidable within a plane parallel to the plane of second direction relative to a pair of outer slide surfaces of the slide member at the side of the driven shaft, the first inner slide surface and the second inner slide surface including a plane formed by the intermediate rib.

In the present invention, the foregoing slide member at the side of the driving shaft and the foregoing slide member at the side of the driven shaft may be each made of metal, and the foregoing transmitting member is made of plastic. Further, in another embodiment, the foregoing slide member at the side of the driving shaft is provided two at the symmetrical positions relative to the rotational axis of the driving shaft, and the foregoing slide member at the side of the driven shaft is provided two at the symmetrical positions relative to the rotational axis of the driven shaft. Further, in the present invention, there is also an embodiment in which the foregoing first and second directions intersect at a right angle with each other.

DESCRIPTION OF THE PREFERRED EMBODIMENTS

A specific embodiment of the present invention is hereinafter described with reference to the accompanying drawings.

Figure 1:
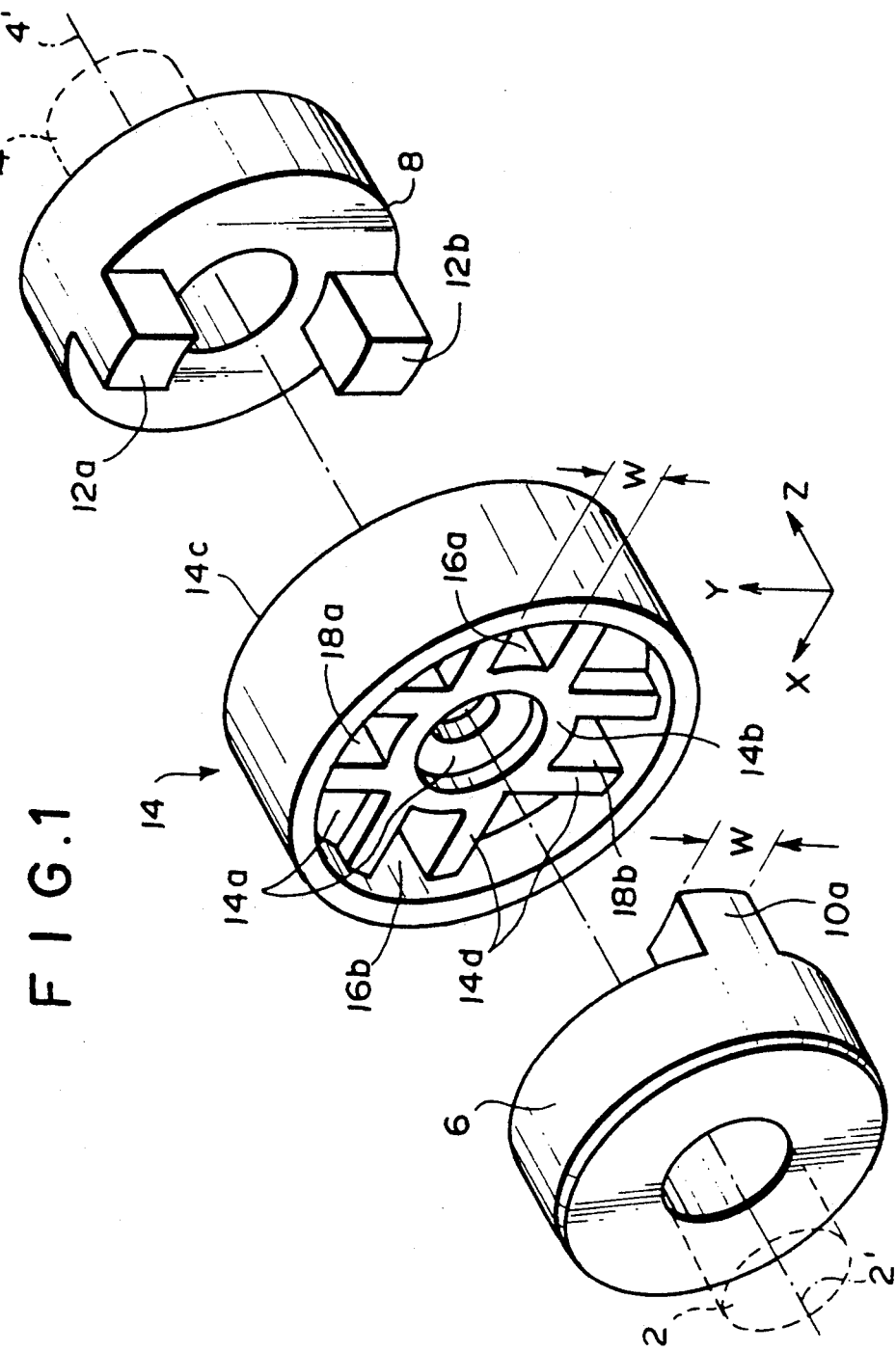
FIG. 1 is an exploded perspective view of a specific embodiment of the shaft coupling according to the present invention.
Figure 2:
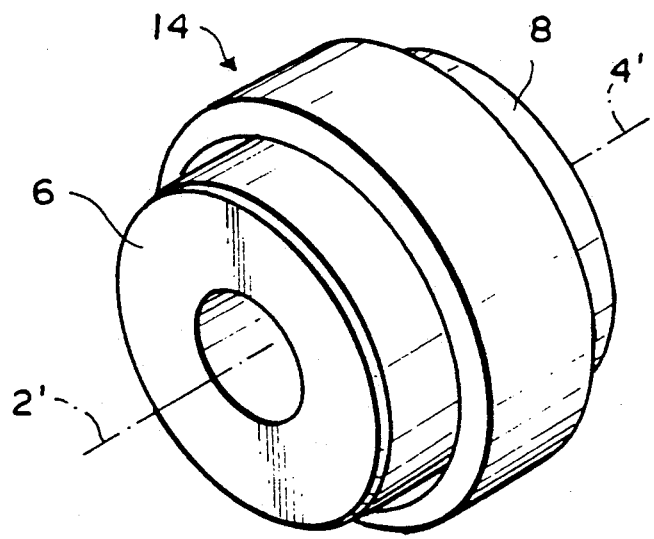
FIG. 2 is a perspective view of the assembled shaft coupling of FIG. 1.
Figure 3:
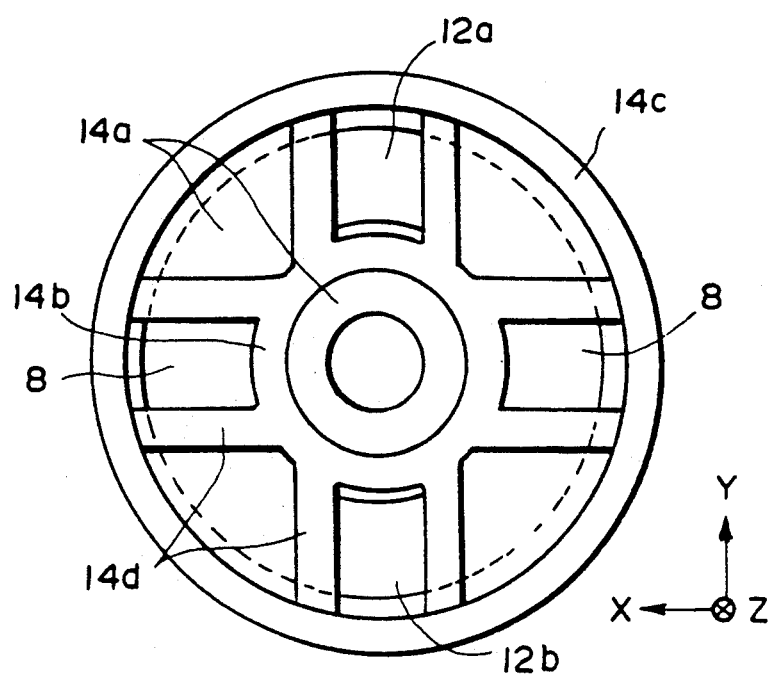
FIG. 3 is a partially omitted frontal view of the shaft coupling of FIG. 1.
Figure 4:
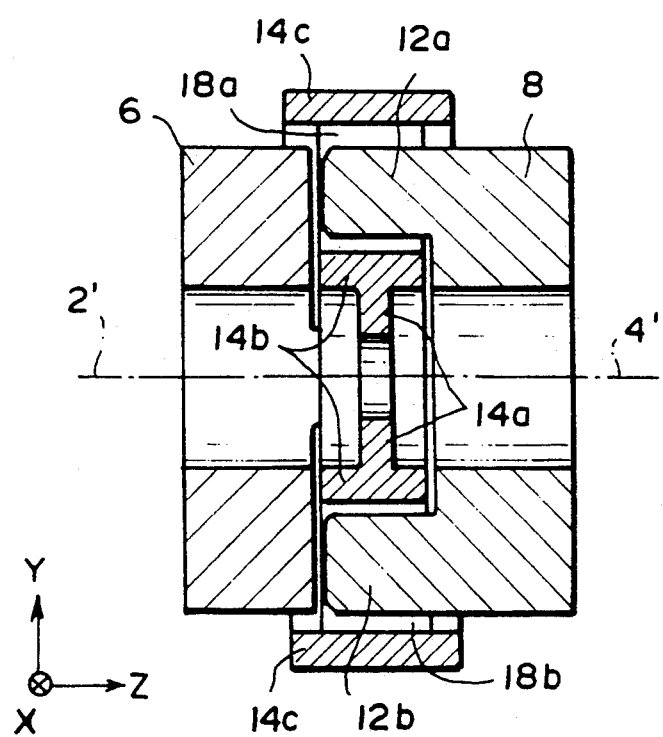
FIG. 4 is a longitudinal cross-sectional view of the shaft coupling of FIG. 1.

FIG. 1 is an exploded perspective view of a specific embodiment of the shaft coupling according to the present invention. FIG. 2 is a perspective view thereof when assembled. FIGS. 3 and 4 are respectively a partially omitted frontal view and a longitudinal cross-sectional view thereof.

In these figures, 2 denotes the end portion of the driving shaft, and 2' the rotational axis of the driving shaft. Further, 4 denotes the end portion of the driven shaft, and 4' the rotational axis of the driven shaft. The end portion 2 of the driving shaft and the end portion 4 of the driven shaft are opposedly disposed so that their rotational axes 2', 4' align with each other in the Z direction. The shaft coupling according to this embodiment couples these end portions 2 and 4 of the driving shaft and the driven shaft respectively.

On the outer peripheral surface of the end portion 2 of the driving shaft, a metallic mount member 6 at the side of the driving shaft is mounted. This mounting is carried out by means of a proper means such as a key or spline or by pressing in, and the driven side end surface of the mount member 6 is set so that it lies within a substantially the same plane with the driven side end surface of the end portion 2 of the driving shaft. At the driven side end surface of the mount member 6 at the symmetrical positions relative to the rotational axis 2' of the driving shaft, two slide members 10a and 10b (not shown) at the side of the driving shaft protrude. On these slide members 10a, 10b, a pair of outer slide surfaces parallel to the X-Z plane is each formed. The dimension (as measured in the Y direction) between the pair of outer slide surfaces is equal to W.

Similarly, on the outer peripheral surface of the end portion 4 of the driven shaft, a metallic mount member 8 at the side of the driven shaft is mounted. This mounting is carried out by any proper means such as a key or spline or by pressing in, and the driving side end surface of the mount member 8 is set so that it lies in substantially the same plane with the driving side end surface of the end portion 4 of the driven shaft. At the driving side end surface of the mount member 8 at the symmetrical positions relative to the rotational axis 4' of the driven shaft, two slide members 12a, 12b at the side of the driven shaft protrude. On these slide members 12a, 12b, a pair of outer slide surfaces parallel to the Y-Z plane is each formed. The dimension (as measured in the X direction) between the pair of outer slide surfaces is also equal to W.

14 denotes a torque transmitting member which is disposed between the mount members 6 and 8. The transmitting member 14 comprises a disk portion 14a parallel to the X-Y plane, an inner circumferential rib 14b and an outer circumferential rib 14c concentrically formed with the rotational axes 2' and 4' of the driving shaft and the driven shaft as its axis and an intermediate rib 14d extending between these ribs 14b, 14c. These ribs 14b, 14c, 14d are each formed so as to protrude from the disk portion 14a toward the driving side and the driven side. Through the transmitting member 14, four through holes 16a, 16b, 18a, 18b passing through in the Z direction are formed. These through holes each include a plane formed by the intermediate rib 14d.

On the through holes 16a, 16b, a pair of inner slide surfaces parallel to the X-Z plane is formed and, on the through holes 18a, 18b, a pair of inner slide surfaces parallel to the Y-Z plane is formed. The dimension between the pair of inner slide surfaces of each through hole is equal to W. The through hole 16a receives the slide member 10a at the side of the driving shaft allowing for a room at both ends as viewed in the X direction, the through hole 16b receives the slide member 10b at the side of the driving shaft allowing for a room at both ends as viewed in the X direction, the through hole 18a receives the slide member 12a at the side of the driven shaft allowing for a room at both ends as viewed in the Y direction and the through hole 18b receives the slide member 12b at the side of the driven shaft allowing for a room at both ends as viewed in the Y direction. Thus, the outer slide surface of each slide member is slidable relative to the corresponding inner slide surface of the transmitting member 14.

Incidentally, as the transmitting member 14, a plastic material properly slidable relative to the metallic material of the slide members 10a, 10b and 12a, 12b, properly strong and further properly flexible, such as a polyacetal resin or polyamide resin may be used.

In this embodiment, the transmitting member 14 can be shifted relative to the mount member 6 at the side of the driving shaft by sliding in the X and Z directions relative to the slide members 10a, 10b at the side of the driving shaft and by being rotated with the Y direction as its axis, and can be shifted relative to the mount member 8 at the side of the driven shaft by sliding in the Y and Z directions relative to the slide members 12a, 12b at the side of the driven shaft and by being rotated with the X direction as its axis.

In this embodiment, when the end portion 2 of the driving shaft is rotated, the torque is transmitted from the slide members 10a, 10b at the side of the driving shaft, which is formed on the mount member 6 at the side of the driving shaft, through the transmitting member 14 to the mount member 8 at the side of the driven shaft, where the slide members 12a, 12b at the side of the driven shaft are formed, to rotate the end portion 4 of the driven shaft. When any eccentricity, angular deviation or the axial movement takes place to the end portions 2 and 4, they can be effectively coped with by the relative shift between the transmitting member 14 and the slide members 10a, 10b at the side of the driving shaft and between the transmitting member 14 and the slide members 12a, 12b at the side of the driven shaft. Incidentally, the interval between the end portions 2 and 4 is set greater than the dimension of the inner circumferential rib 14b portion and the intermediate rib 14d portion of the transmitting member 14, as measured in the Z direction, by the expected axial movement.

The foregoing shaft coupling according to this embodiment is readily manufactured by assembling the members as illustrated in FIG. 1.

If, in this embodiment, as the transmitting member 14, one made of a plastic material is used, since it is properly flexible, the transmission of vibrations between the driving shaft side and the driven shaft side can be suppressed, and the transmission of the torque when the load is abruptly changed can be smoothly changed. Further, since it exhibits a self-lubricity in the slidable contact with the slide members 10a, 10b and slide members 12a, 12b, it is not necessary to use any lubricating oil, and its maintenance is easy.

In addition, in this embodiment, since the through holes 16a, 16b, 18a, 18b, which come in slidable contact with the slide members 10a, 10b and 12a, 12b, are formed including the lateral surface of the intermediate rib 14d, even if the disk portion 14a of the transmitting member 14 is thin, the contact area over which they slide can be secured greatly, which can lend itself to making the load applied per unit area small and lessening the wear, so that, despite its lightweight, a great torque can be transmitted. In addition, since the transmitting member 14 is lightweight, the magnitude of the vibration taking place along with the eccentric movement of the transmitting member is also small.

Incidentally, since, as illustrated, the dimension of the outer circumferential rib 14c portion as viewed in the Z direction is set greater than that of the inner circumferential rib 14b portion and the intermediate rib 14d portion as measured in the Z direction, the strength is further increased and, the outer circumferential rib 14c also serves as a cover for preventing the intrusion of dust from outside.

As described above, according to the present invention, there can be provided a novel shaft coupling which can effectively cope with the eccentricity, angular deviation and the axial movement between the driving shaft side and the driven shaft side and which is simple in arrangement and lightweight, and transmits a great torque.

What is claimed is:

1. A shaft coupling for coupling the end portion of a driving shaft and the end portion of a driven shaft, which are opposed to each other, wherein:
   a driving side mount member attachable to the end portion of the driving shaft is provided with a driving side slide member having a pair of first outer slide surfaces running parallel to a plane of first direction passing through a rotational axis of the driving shaft and extending toward the driven side;
   a driven side mount member attachable to the end portion of the driven shaft is provided with a driven side slide member having a pair of second outer slide surfaces running parallel to a plane of second direction passing through a rotational axis of the driven shaft and extending toward the driving side;
   a torque transmitting member is disposed between said driving side mount member and said driven side mount member, said transmitting member comprising a disk portion intersecting at a substantially right angle with the rotational axis of the driving shaft and driven shaft, an inner circumferential rib, an outer circumferential rib and an intermediate rib extending between the inner and outer circumferential ribs, the inner and outer circumferential ribs and the intermediate rib being attached to said disk portion and protruding from said disk portion toward the driving side and the driven side, said transmitting member having a pair of first inner slide surfaces slidable to said first outer slide surfaces of the driving side slide member, and a pair of second inner slide surfaces slidable to said second outer slide surfaces of the driven side slide member, said first inner slide surfaces and said second inner slide surfaces each facing an opening in said disk portion and comprising a lateral surface of the intermediate rib; and
   said driving side slide member and said driven side slide member are each made of metal, and said transmitting member is made of plastic.

2. The shaft coupling as set forth in claim 1, wherein two driving side slide members are provided at symmetrical positions relative to the rotational axis of the driving shaft, and two driven side slide members are provided at symmetrical positions relative to the rotational axis of the driven shaft.

3. The shaft coupling as set forth in claim 1, wherein said first direction and said second direction intersect at a right angle with each other.

* * * * *